(12) United States Patent
Lv et al.

(10) Patent No.: US 9,509,403 B2
(45) Date of Patent: Nov. 29, 2016

(54) METHOD FOR IMPLEMENTING DIMMING, AND DIMMING APPARATUS

(71) Applicant: ZTE CORPORATION, Shenzhen, Guangdong Province (CN)

(72) Inventors: Ning Lv, Shenzhen (CN); Zhou Zhi, Shenzhen (CN); Zhong Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/901,086

(22) PCT Filed: Sep. 18, 2013

(86) PCT No.: PCT/CN2013/083764
§ 371 (c)(1),
(2) Date: Dec. 28, 2015

(87) PCT Pub. No.: WO2014/205926
PCT Pub. Date: Dec. 31, 2014

(65) Prior Publication Data
US 2016/0142137 A1    May 19, 2016

(30) Foreign Application Priority Data

Jun. 27, 2013 (CN) .......................... 2013 1 0263440

(51) Int. Cl.
| H05B 37/02 | (2006.01) |
| H04B 10/116 | (2013.01) |
| H04L 12/28 | (2006.01) |
| G08C 23/04 | (2006.01) |
| H04Q 11/00 | (2006.01) |

(52) U.S. Cl.
CPC ............ *H04B 10/116* (2013.01); *G08C 23/04* (2013.01); *H04L 12/282* (2013.01); *H04Q 11/0003* (2013.01); *H05B 37/0209* (2013.01)

(58) Field of Classification Search
CPC  H05B 37/0209; H04B 10/116; G08C 23/04; H04L 12/282; H04Q 11/0003
USPC ........................................................ 315/307
See application file for complete search history.

(56) References Cited

U.S. PATENT DOCUMENTS

| 5,611,038 A | * | 3/1997 | Shaw ................ G06F 17/30011 |
| | | | 348/390.1 |
| 6,928,289 B1 | * | 8/2005 | Cho ....................... H04W 60/00 |
| | | | 370/310.2 |
| 2011/0161076 A1 | * | 6/2011 | Davis .................. G06F 3/04842 |
| | | | 704/231 |

FOREIGN PATENT DOCUMENTS

| CN | 1898912 A | 1/2007 |
| CN | 101326775 A | 12/2008 |
| CN | 102948101 A | 2/2013 |
| EP | 1624618 A1 | 2/2006 |

* cited by examiner

*Primary Examiner* — Douglas W Owens
*Assistant Examiner* — Syed M Kaiser
(74) *Attorney, Agent, or Firm* — Ling Wu; Stephen Yang; Ling and Yang Intellectual Property

(57) ABSTRACT

A method and apparatus for implementing dimming are disclosed. The method includes: at an MAC layer, dividing an MSDU into two or more sub-MSDUs with a same length; encapsulating each sub-MSDU obtained after dividing into a separate MPDU, and generating a compensation frame for each MPDU; and aggregating the MPDUs and the compensation frames with the same addresses into a PSDU part of a PPDU and transmitting a physical frame.

12 Claims, 3 Drawing Sheets

METHOD FOR IMPLEMENTING DIMMING, AND DIMMING APPARATUS

TECHNICAL FIELD

The present document relates to the visible light communication technology, and particularly, to a method for implementing dimming and a dimming apparatus.

BACKGROUND OF THE RELATED ART

The Visible Light Communication (VLC) technology refers to the technology of using the wavelength visible to human naked eyes to perform short-distance optical wireless communication in optical media within a scope of 400 nm to 700 nm. The VLC technology has advantages such as being immune to electromagnetic interference and the inexistence of interference related to a Radio Frequency (RF) system, and a spectrum range used in the VLC technology is an Unlicensed Spectrum. When the data transmission is performed with the visible light, at a sending end, the brightness of the visible light source can be modulated by speedily opening and closing a visible light source (e.g. a light emitting diode); and at a receiving end, after receiving a modulated optical signal, the optical signal is converted into data that can be processed by the receiving end.

When the communication is performed with the visible light, firstly it must guarantee that the normal use of the lighting equipment by the users is not affected while implementing the data transmission. It is required to consider the following two problems: one is to implement the high-speed data transmission; and the other is to support adjusting the brightness of the light source, namely Dimming.

In the Institute of Electrical and Electronic Engineers (IEEE) 802.15.7 visible light communication standard, there are roughly two ways for solving the brightness adjustment: one way is: in an idle/receiving state, the sending end implementing the dimming by using an idle mode, that is, by independently sending frames used for adjusting the brightness, and the transmission overhead is undoubtedly increased in this way; and the other way is: at the physical layer, performing the dimming by using an idle mode closely related to the modulation mode and channel coding scheme, only rough brightness adjustment can be performed in this way, and a brightness value is fixed, which reduces the flexibility of the dimming.

SUMMARY

The embodiments of the present document provide a method for implementing dimming and a dimming apparatus, which can flexibly and subtly implement dimming in a visible light communication system, and save the overhead in the meantime.

The embodiment of the present document provides a method for implementing dimming, which comprises:

dividing a Media Access Control (MAC) Service Data Unit (MSDU) into two or more sub-MSDUs with a same length;

encapsulating each sub-MSDU obtained after dividing into a separate MAC Protocol Data Units (MPDU), and generating a Compensation Frame (CF) used for adjusting a brightness of a light source in a data transmission process for each MPDU; and aggregating the MPDUs and the CFs with same addresses into a PHY Service Data Unit (PSDU) part of a Physical Protocol Data Unit (PPDU) and transmitting a physical frame.

Alternatively, the method further comprises:
judging that an address of the MSDU is a unicast address.
Alternatively, the CF of the each MPDU and the MPDU in which the CF is located have a same target address.
Alternatively, a proportional relation between the each MPDU and the CF corresponding to the each MPDU in a PSDU satisfies the following formula:

$$1 - \frac{n_i + m_i + Len_{CFD(i)}}{Len_{MPDU(i)} + Len_{CFH(i)} + Len_{CFD(i)}} \leq K \cdot \frac{\Delta B}{B},$$

wherein, B is the brightness of the light source in a state of no data transmission, $\Delta B$ is a brightness variation of the light source, and K is a constant;

MPDU(i) represents an MPDU used for encapsulating an ith sub-MSDU; $n_i$ represents a number of "1"s in the MPDU(i), $m_i$ represents a number of "1"s in a header CFH(i) of a CF(i), wherein, the CF(i) represents a CF corresponding to the MPDU(i); $Len_{CFD(i)}$ represents a length of a data part CFD(i) of the CF(i), $Len_{MPDU(i)}$ represents a length of the MPDU(i), $Len_{CFH(i)}$ represents a length of the header CFH (i) of the CF(i), and i is greater than or equal to 1.

Alternatively, there is a one-to-one correspondence between the MPDU and the CF corresponding to the MPDU.

Alternatively, the brightness variation of the light source after the dimming is less than a brightness variation that can be sensed by human eyes.

Alternatively, when the CF is used for brightening, a value of a data part of the CF is an all-1-sequence.

Alternatively, lengths of the all-1-sequences are different, and different lengths correspond to different brightening degrees.

The embodiment of the present document further provides a dimming apparatus, which comprises: a processing module, a storage module and an optical driver transmission module, wherein, the storage module is configured to: save dimming information with different lengths used for adjusting a brightness of a light source;

the processing module is configured to: divide a received MAC service data unit (MSDU) into two or more sub-MSDUs with a same length; encapsulate each sub-MSDU obtained after dividing into a separate MAC protocol data units MPDU, and generate a compensation frame (CF) for each MPDU; and aggregate the MPDUs and the CFs with same addresses into a physical service data unit (PSDU) part of a physical protocol data unit (PPDU) to transmit to the optical driver transmission module; and the optical driver transmission module is configured to: implement data transmission, light source brightness adjustment and lighting;

wherein, dimming information in the CF is read from the storage module.

Alternatively, the dimming information is all-1-sequences with different lengths.

Alternatively, the dimming apparatus is configured in a sending end of a visible light communication system, or is separately configured at a sending side of a visible light system.

As can be seen from the scheme of implementing the dimming in the embodiments of the present document, on the one hand, independent of the modulation mode and channel coding scheme adopted during the data transmission, the flexible and subtle dimming in the visible light communication system is implemented in the scheme; on the other hand, the dimming is performed within the frame with the frame aggregation technology of the MAC layer in the embodiments of the present document, which saves the overhead.

PREFERRED EMBODIMENTS OF THE INVENTION

Figure 1:
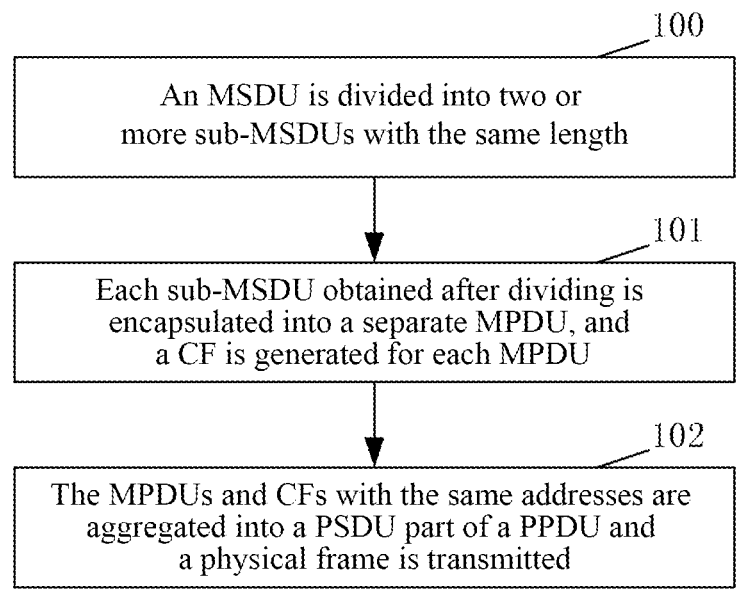
FIG. 1 is a flow chart of a method for implementing dimming according to the embodiment of the present document.

FIG. 1 is a flow chart of a method for implementing dimming according to the embodiment of the present document, and as shown in FIG. 1, the following steps are included.

In step 100, an MSDU is divided into two or more sub-MSDUs with the same length.

Wherein, a sum of lengths of a dimming frame corresponding to a physical layer header, an MPDU in which a single sub-MSDU is encapsulated and a dimming frame corresponding to the MPDU must be less than or equal to a maximum value of the length of a PSDU (a value thereof is a fixed value). Therefore, an upper limit value of the length of a single sub-MSDU is limited.

Figure 2:
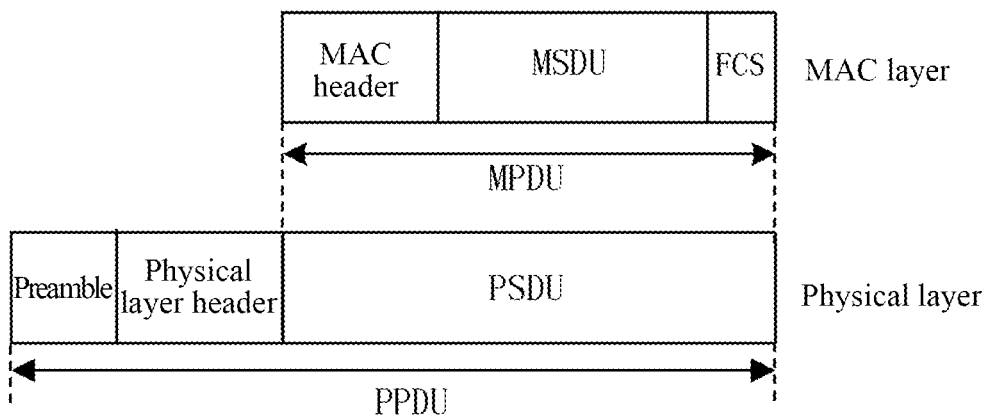
FIG. 2 is a schematic diagram of a composition structure of an MAC layer and a physical layer of the IEEE802.15.7 standard.

FIG. 2 is a schematic diagram of a composition structure of an MAC layer and a physical layer of the IEEE802.15.7 standard.

Before the step, the above method also includes: judging whether an address of the MSDU in which an upper-layer data unit is encapsulated is a unicast address, if the address of the MSDU is the unicast address, continuing to execute the step 100; and if the address of the MSDU is not the unicast address, directly transmitting a physical frame.

In step 101, each sub-MSDU obtained after dividing is encapsulated into a separate MPDU, and a compensation frame is generated for each MPDU.

Figure 3:
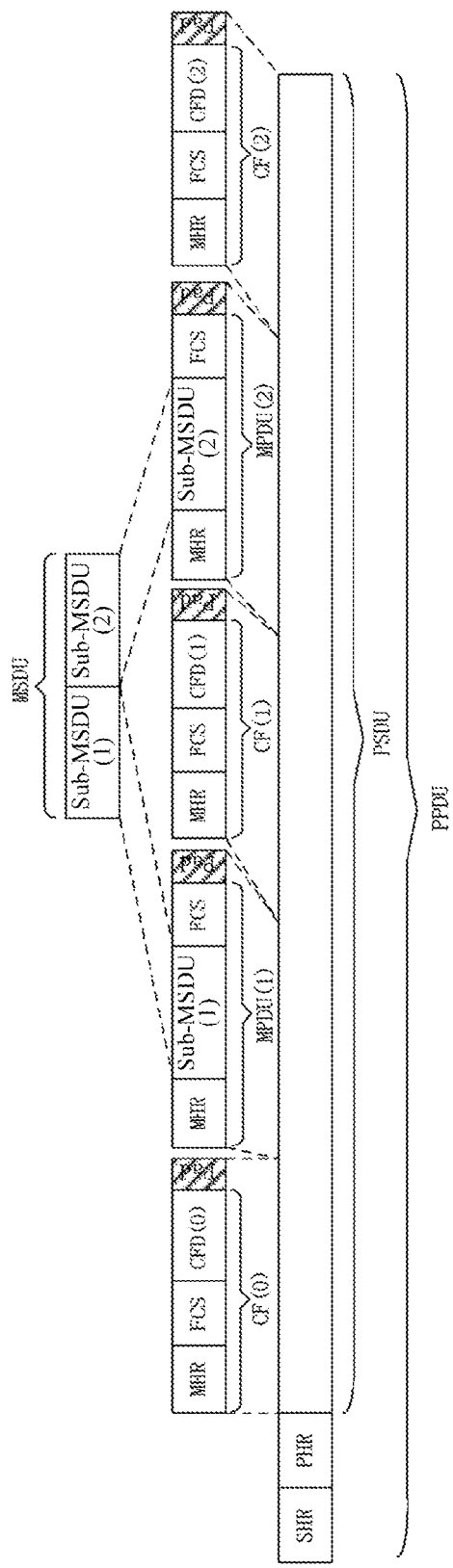
FIG. 3 is a schematic diagram of a composition structure of a data part of a PPDU according to the embodiment of the present document.

FIG. 3 is a schematic diagram of a composition structure of a data part of a PPDU according to the embodiment of the present document, and as shown in FIG. 3, the sub-MSDUs are encapsulated into separate MPDUs. Within a period T, according to a brightness variation of the light source that can be sensed by the human naked eyes, a CF that has the same target address with the MPDU is generated for each MPDU, and the CF is used for adjusting the brightness of the light source in the data transmission process, and a CF Data (CFD) part is a valid data part of the CF. MPDU(i) represents an MPDU used for encapsulating an ith sub-MSDU; CF(i) represents a compensation frame used for performing dimming on an MPDU(i) frame, wherein, the parameter i is greater than or equal to 1. In the FIG. 3, an MAC Header (MHR) represents a header of the MAC layer, a Frame Check Sequence (FCS) represents a check value of an MAC frame, and a Pad part is a pad field aligned to a 32-bit word boundary. In order to achieve a better dimming object, the Pad field is padded with all "1"s, and a length of the Pad field is 0 to 31 bits.

Wherein, within the period T, the length $Len_{CFD(i)}$ of the ith CFD part corresponding to the MPDU(i) is determined through the formula (1):

$$1 - \frac{n_i + m_i + Len_{CFD(i)}}{Len_{MPDU(i)} + Len_{CFH(i)} + Len_{CFD(i)}} \leq K \cdot \frac{\Delta B}{B} \qquad (1)$$

it can be obtained that, $$Len_{CFD(i)} \geq \frac{\left(1 - K \cdot \frac{\Delta B}{B}\right) \cdot (Len_{MPDU(i)} + Len_{CFH(i)}) - n_i - m_i}{K \cdot \frac{\Delta B}{B}} \qquad (2)$$

In the formulas (1) and (2), B is the brightness of the light source in a state of no data transmission, ΔB is the brightness variation of the light source, and a constant K is obtained by subjective experiments in the practical applications. According to the Weber-Fechner Law, the people skilled in the art know that, $$K \cdot \frac{\Delta B}{B}$$

reflects the brightness variation that can be sensed by the human eyes within the period T. $n_i$ represents the number of "1"s in the MPDU(i), $m_i$ represents the number of "1"s in a header CFH(i) of the CF(i) (a CFH is composed of the MHR field and FCS field in the CF), $Len_{MPDU(i)}$ represents a length of the MPDU(i), $Len_{CFH(i)}$ represents a length of the header CFH(i) of the CF(i), and $Len_{CFD(i)}$ represents a length of a data part CFD(i) of the CF(i). The Pad field is a pad field of an all-"1"-sequence, and it has a dimming function, and a length of the Pad field is much less than the length of the CF and the length of the MPDU. The calculation of the length of the Pad field is omitted in the formula (1), but the dimming function of the CFD part calculated through the formula (1) is not affected.

Figure 4:
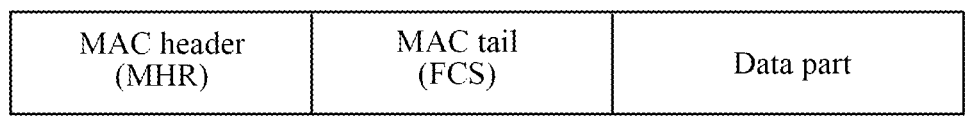
FIG. 4 is a schematic diagram of a format of a Color Visibility Dimming (CVD) frame in the IEEE 802.15.7 standard.

In the step, the compensation frame used for the dimming can use a format of a Color/Visible/Dimming (CVD) frame in the IEEE 802.15.7 standard, and as shown in FIG. 4, an MAC header (MHR) field contains control information of the CVD frame, an MAC tail (FCS) field contains check information of the MAC header field, and a data part field contains data contents of the CVD frame. In contrast to the FIG. 3, the MHR field and the FCS field of the CVD frame constitute the header CFH of the CF, and the data part field of the CVD frame corresponds to the data part CFD of the CF.

When the compensation frame is used for brightening the light source, the value of the compensation frame is an all-"1"-sequence. When a luminance state of the light source set by the user is light, that is, when the luminance state is opened, if the data are transmitted at this point, the brightness of the light source will be made weaker than the opened state, thus it is required to insert a brightening compensation frame to restore the luminance state of the light source. The values of the compensation frames used for the dimming (i.e. the contents of the data parts) are the same, namely the all-"1"-sequence. The lengths of the compensation frames can be different, that is to say, a brightening degree can be determined according to the length of the compensation frame. The way for taking the value of the length of the compensation frame is:

All-"1"-sequences with different lengths are preset. When a compensation frame is generated, dimming information in which corresponding lengths are saved can be directly given to the compensation frame. If the saved lengths are not the required length of the compensation frame, a data part of the required length of the compensation frame can be generated by combining the saved sequences. For example, all-"1"-sequences with lengths of 100 bits, 200 bits and 400 bits are saved in advance, and when the compensation frame is generated, besides the sequences with the saved lengths can be represented, all-"1"-sequences with lengths of 300 bits (i.e. 100 bits plus 200 bits), 500 bits (i.e. 100 bits plus 400 bits), 600 bits (i.e. 200 bits plus 400 bits) and 700 bits (i.e. 100 bits plus 200 bits plus 400 bits) also can be represented.

In step 102, the MPDUs and the compensation frames with the same addresses are aggregated into a PSDU part of a PPDU and a physical frame is transmitted.

Since the MPDU in which the sub-MSDU is encapsulated and the compensation frame have the same target address, in the step, a plurality of MPDUs and a plurality of compensation frames are aggregated into one PSDU with the frame aggregation way at the bottom of the MAC layer, as shown in FIG. 3. In the method of the embodiment of the present document, through the frame aggregation technology, the problem of the transmission efficiency reduction that may be generated due to the MSDU segmentation technology and the frame compensation is improved.

As can be seen from the method for implementing the dimming in the embodiment of the present document, on the one hand, independent of the modulation mode and channel coding scheme adopted during the data transmission, the flexible and subtle dimming in the visible light communication system is implemented; on the other hand, the dimming is performed within the frame with the MAC frame aggregation technology in the embodiments of the present document, which saves the overhead.

As shown in the FIG. 3, according to the method shown in the FIG. 1 of the embodiment of the present document, one MSDU is divided into two data segments: a sub-MSDU (1) and a sub-MSDU (2); wherein, the sub-MSDU (1) is encapsulated to generate a MPDU (1), and the sub-MSDU (2) is encapsulated to generate a MPDU (2); according to the formula (2), a compensation frame CF (1) corresponding to the MPDU (1) and a compensation frame CF (2) corresponding to the MPDU (2) are generated, and the CF (1) is used for dimming of an MPDU (1) frame, and the CF (2) is used for dimming of an MPDU (2) frame. The target addresses of the CF and the MPDU corresponding to the CF are identical.

Particularly, a CF (0) is used for dimming of a Physical Header (PHR) and a Synchronization Header (SHR). Since the PHR and the SHR are generated at the physical layer, and the generation of the CF (0) is at the MAC layer, a length of the CF (0) cannot be directly obtained through the formula (1). However, since a length of the PHR is fixed, and a length and a bit sequence of the SHR are determined, the CF (0) still can accurately perform dimming for the PHR field and the SHR field. Alternatively, in order to satisfy that the brightness variation after the dimming is less than a brightness variation that can be sensed by human eyes, it can be assumed that a bit sequence of the PHR is all "0"s, and then the length of the CF (0) is obtained by calculating with the formula (1).

Finally, as shown in the FIG. 3, these compensation frames and MPDUs with the same target addresses are aggregated into one PSDU, and the PSDU constitutes a data part of a PPDU, and then the data part will be transmitted at the physical layer.

Figure 5:
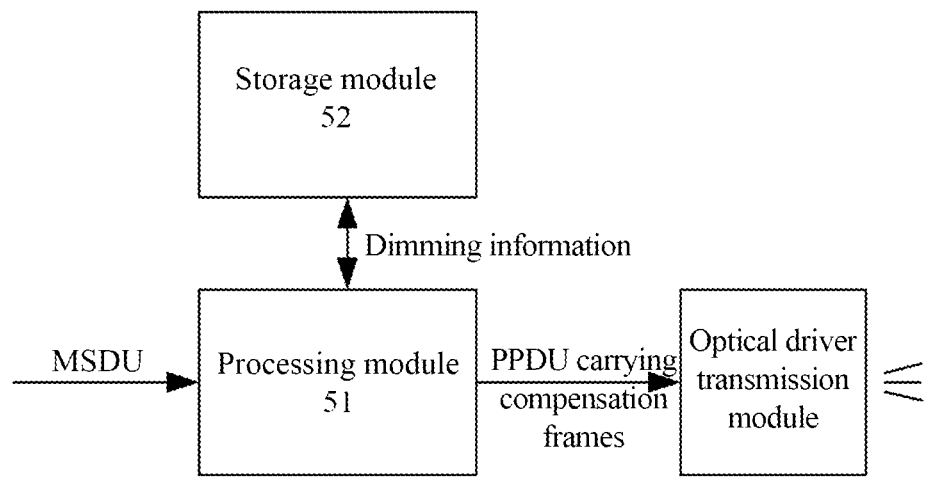
FIG. 5 is a schematic diagram of a composition structure of a dimming apparatus according to the embodiment of the present document.

FIG. 5 is a schematic diagram of a composition structure of a dimming apparatus according to the embodiment of the present document, and the dimming apparatus can be set at a sending end of the visible light communication system or be separately set, and as shown in FIG. 5, a processing module 51, a storage module 52 and an optical driver transmission module 53 are included, wherein, the storage module 52 is used to save dimming information with different lengths used for adjusting a brightness of a light source, and the dimming information includes all-"1"-sequences with different lengths.

The processing module 51 is used to: divide an MSDU received from a Logical Link Control (LLC) sublayer into two or more sub-MSDUs with the same length; encapsulate each sub-MSDU obtained after dividing into a separate MPDU, and generate a CF for each MPDU; and aggregate the MPDUs and the CFs with the same addresses into a PSDU part of a PPDU to transmit to the optical driver transmission module 53.

The optical driver transmission module 53 is used to implement data transmission, light source brightness adjustment and lighting, and the implementation thereof belongs to the related art, and the implementation thereof is not used to limit the protection scope of the embodiments of the present document, which will not be repeated here.

Wherein, dimming information in the compensation frame is all-"1"-sequences with different lengths read from the storage module 52.

The above description is only the preferred embodiments of the present document, which is not used to limit the present document. All the modifications, equivalent substitutions, and improvements, etc. made within the spirit and principle of the embodiments of the present document shall fall into the protection scope of the appended claims of the present document.

INDUSTRIAL APPLICABILITY

Through the scheme of the embodiments of the present document, the flexible and subtle dimming in the visible light communication system is implemented, and the overhead is saved in the meantime.

What is claimed is:
1. A method for implementing dimming, comprising:
dividing a media access control (MAC) service data unit (MSDU) into two or more sub-MSDUs with a same length;
encapsulating each sub-MSDU obtained after dividing into a separate MAC protocol data unit (MPDU), and generating a compensation frame (CF) used for adjusting a brightness of a light source in a data transmission process for each MPDU; and
aggregating the MPDUs and the CFs with same addresses into a physical service data unit (PSDU) part of a physical protocol data unit (PPDU) and transmitting a physical frame.
2. The method according to claim 1, further comprising:
judging that an address of the MSDU is a unicast address.

3. The method according to claim 2, wherein,
the CF of the each MPDU and the MPDU in which the CF is located have a same target address.

4. The method according to claim 3, wherein,
a proportional relation between the each MPDU and the CF corresponding to the each MPDU in a PSDU satisfies the following formula:

$$1 - \frac{n_i + m_i + Len_{CFD(i)}}{Len_{MPDU(i)} + Len_{CFH(i)} + Len_{CFD(i)}} \leq K \cdot \frac{\Delta B}{B},$$

wherein, B is the brightness of the light source in a state of no data transmission, $\Delta B$ is a brightness variation of the light source, and K is a constant;
MPDU(i) represents an MPDU used for encapsulating an ith sub-MSDU; $n_i$ represents a number of "1"s in the MPDU(i), $m_i$ represents a number of "1"s in a header CFH(i) of a CF(i), wherein, the CF(i) represents a CF corresponding to the MPDU(i); $Len_{CFD(i)}$ represents a length of a data part CFD(i) of the CF(i), $Len_{MPDU(i)}$ represents a length of the MPDU(i), $Len_{CFH(i)}$ represents a length of the header CFH(i) of the CF(i), and i is greater than or equal to 1.

5. The method according to claim 1, wherein,
there is a one-to-one correspondence between the MPDU and the CF corresponding to the MPDU.

6. The method according to claim 5, wherein,
the brightness variation of the light source after the dimming is less than a brightness variation that can be sensed by human eyes.

7. The method according to claim 5, wherein,
when the CF is used for brightening, a value of a data part of the CF is an all-1-sequence.

8. The method according to claim 7, wherein,
lengths of the all 1 sequences are different, and different lengths correspond to different brightening degrees.

9. A dimming apparatus, comprising: a processing module, a storage module and an optical driver transmission module, wherein,
the storage module is configured to: save dimming information with different lengths used for adjusting a brightness of a light source;
the processing module is configured to: divide a received media access control MAC service data unit (MSDU) into two or more sub-MSDUs with a same length; encapsulate each sub-MSDU obtained after dividing into a separate MAC protocol data unit (MPDU), and generate a compensation frame (CF) for each MPDU; and aggregate the MPDUs and the CFs with same addresses into a physical service data unit (PSDU) part of a physical protocol data unit (PPDU) to transmit to the optical driver transmission module; and
the optical driver transmission module is configured to: implement data transmission, light source brightness adjustment and lighting;
wherein, dimming information in the CF is read from the storage module.

10. The dimming apparatus according to claim 9, wherein,
the dimming information is all-1-sequences with different lengths.

11. The dimming apparatus according to claim 9, wherein,
the dimming apparatus is configured in a sending end of a visible light communication system, or is separately configured at a sending side of a visible light system.

12. The dimming apparatus according to claim 10, wherein,
the dimming apparatus is configured in a sending end of a visible light communication system, or is separately configured at a sending side of a visible light system.

* * * * *